US012751381B1

(12) United States Patent
Luo et al.

(10) Patent No.: US 12,751,381 B1
(45) Date of Patent: Oct. 6, 2026

(54) NUTRIENT WATER-RETAINING MAT FOR ARTIFICIAL CULTIVATION OF MOSS CRUSTS

(71) Applicant: Northwest Institute of Eco-Environment and Resources, CAS, Lanzhou City (CN)

(72) Inventors: Yayong Luo, Lanzhou City (CN); Wei Liu, Lanzhou City (CN); Jinghui Zhang, Lanzhou City (CN); Xiangnan Jing, Lanzhou City (CN); Binghao Chen, Lanzhou City (CN); Xinyu Zhao, Lanzhou City (CN); Canyu Shi, Lanzhou City (CN); Mi Xia, Lanzhou City (CN); Hesong Wang, Lanzhou City (CN)

(73) Assignee: Northwest Institute of Eco-Environment and Resources, CAS, Lanzhou City (CN)

( * ) Notice: Subject to any disclaimer, the term of this patent is extended or adjusted under 35 U.S.C. 154(b) by 0 days.

(21) Appl. No.: 19/232,925

(22) Filed: Jun. 10, 2025

(30) Foreign Application Priority Data

Apr. 8, 2025 (CN) ......................... 202510434219.0

(51) Int. Cl.
*A01G 20/20* (2018.01)
*A01G 22/30* (2018.01)

(52) U.S. Cl.
CPC ............. *A01G 20/20* (2018.02); *A01G 22/30* (2018.02)

(58) Field of Classification Search
CPC ................................ A01G 20/20; A01G 22/30
See application file for complete search history.

(56) References Cited

FOREIGN PATENT DOCUMENTS

| | | | | | |
|---|---|---|---|---|---|
| CN | 107165175 | A | * | 9/2017 | ........... E02D 17/205 |
| CN | 109526654 | A | * | 3/2019 | ............. E02D 17/20 |
| CN | 109831955 | A | * | 6/2019 | |

OTHER PUBLICATIONS

CN-109526654-A Translation (Year: 2019).*
CN-107165175-A Translation (Year: 2017).*
CN-109831955-A Translation (Year: 2019).*

* cited by examiner

*Primary Examiner* — Kimberly S Berona
*Assistant Examiner* — Steven J Shur
(74) *Attorney, Agent, or Firm* — Cooper Legal Group, LLC

(57) ABSTRACT

A nutrient water-retaining mat for artificial cultivation of moss crusts is provided, and a preparation method thereof includes following steps: S1, mixing grass seeds, soil, fertilizer and a water-retaining material to prepare composite nutrient planting soil; S2, laying a layer of degradable plastic net on a surface of the planting soil, and sprinkling a layer of waste natural fibers on a surface of the plastic net; and scattering the composite nutrient planting soil on the waste natural fibers; S3, repeating the step S2, wherein a number of laying layers is more than two; and S4, sprinkling water to keep the soil moist until grass grows to more than 20 cm, leaving 2-4 cm of stubble for cutting, shoveling down along the plastic net at a bottom layer, air drying and compacting to obtain the nutrient water-retaining mat for the artificial cultivation of the moss crusts.

5 Claims, 6 Drawing Sheets

NUTRIENT WATER-RETAINING MAT FOR ARTIFICIAL CULTIVATION OF MOSS CRUSTS

CROSS-REFERENCE TO RELATED APPLICATIONS

This application claims priority to Chinese Patent Application No. 202510434219.0, filed on Apr. 8, 2025, the contents of which are hereby incorporated by reference.

TECHNICAL FIELD

The present disclosure relates to the field of moss crust cultivation technology, and in particular relates to a nutrient water-retaining mat for artificial cultivation of moss crusts.

BACKGROUND

Biological crusts are one of the primary vegetation types in desertified regions, playing a crucial role in ecosystems. Biological crusts have important ecological values such as strong resistance to wind and water erosion, and are an important type of surface cover in arid and semi-arid regions. Biological crusts are also a key component of ecological restoration technology and ecological governance engineering. Biological crusts effectively enhance soil nutrient content, prevent soil erosion and geological disasters, promote the formation of soil aggregates, and improve soil physicochemical properties. Moss crusts are complex composites formed by cryptogamic moss, soil microorganisms, and other related organisms through mycelia, pseudoroots, and secretions binding surface soil particles. Moss crusts are widely distributed as important surface cover features in harsh environments of cold and arid regions, covering over 40% of the living surface in deserts and serving as vital builders and components of desert ecosystems. Extensive systematic research has demonstrated that moss crusts are a significant indicator of surface stability in sandy areas. However, under natural conditions, the formation of moss crusts requires 10 to 20 years or even longer.

SUMMARY

In view of the above, the present disclosure provides a nutrient water-retaining mat for artificial cultivation of moss crusts. The present disclosure overcomes the constraints of water and nutrients in arid regions, targeting soil habitat restoration, and offers advantages such as short construction cycles, high stability, efficient sand fixation, broad applicability, and simple operation. To achieve the above objectives, the present disclosure provides the following solutions.

An aspect of the present disclosure is to provide a preparation method of a nutrient water-retaining mat for artificial cultivation of moss crusts, including the following steps:

S1, mixing grass seeds, soil, fertilizer and a water-retaining material to prepare composite nutrient planting soil;

S2, laying a layer of degradable plastic net on a surface of the planting soil, and sprinkling a layer of waste natural fibers on a surface of the plastic net; and scattering the composite nutrient planting soil on the waste natural fibers;

S3, repeating the step S2, where a number of laying layers is more than two; and S4, sprinkling water to keep the soil moist until grass grows to more than 20 centimeters (cm), leaving 2-4 cm of stubble for cutting, shoveling down along the plastic net at a bottom layer, air drying and compacting to obtain the nutrient water-retaining mat for the artificial cultivation of the moss crusts.

According to the present disclosure, a degradable plastic net is adopted as a substrate to form a nutrient water-retaining mat as a whole in the horizontal direction. Composite nutrient planting soil is laid between layers of the degradable plastic net as a substrate layer for the grass seed growth, mixed with filamentous waste natural fibers. During the grass seed growth, the roots of grass in each layer penetrate through the meshes of the degradable plastic net, and the grass in the topmost layer of grows upwards, while some grass in the middle layer may grow upwards through the meshes, and some grass that does not penetrate through the meshes may grow horizontally. The grass stems and root systems are interwoven with waste natural fibers, and the waste natural fibers are interwoven with the biodegradable plastic net, forming an integrated structure for the nutrient water-retaining mat in the longitudinal direction, so that the nutrient water-retaining mat has good mechanical properties and may be separated from the soil surface as a whole, improving the mobility of the nutrient water-retaining mat. The degradable plastic nets and waste natural fibers have biodegradable properties, serving as nutrient substrates in the early stage of moss growth, gradually degrading during the late stage of moss growth, thereby integrating moss root system with transplanted soil. The water-retaining material absorbs and slowly releases moisture, facilitating moss crust growth in arid or desert regions. The fertilizer may provide nutrients for the grass seed growth, as well as necessary nutrients for the later cultivation of moss crusts, which is beneficial for shortening the cultivation period of moss crusts. After cutting grass plants, the nutrient water-retaining mat is air-dried as a whole and compacted to naturally form a grass mat. Grass straw has a hollow structure, which may be used as a water-retaining material on the one hand, and on the other hand, the grass straw degrades to form organic fertilizer when cultivating moss crusts. In addition, because the moss roots are very small, moss roots are not easy to attach and are easy to be separated from the soil when blown by the wind. The hollow structure of dried grass straw may secure the moss propagules.

Optionally, the grass seeds are selected from at least one of *Lolium perenne* grass seeds, *Vulpia myuros* grass seeds, and *Festuca arundinacea* grass seeds. These three types of grass plants have well-developed root systems, mainly consisting of fibrous roots, which may form a well-developed root network, easily penetrate into the meshes of biodegradable plastic net, and grow fast, shortening the production cycle of the nutritional water-retaining mat. The root system of *Lolium perenne* may penetrate into the soil to a depth of 100-110 cm. Among them, the 0-10 cm soil layer is the area with the most dense vertical distribution of the root system, followed by the 10-20 cm soil layer. This depth of root system helps plants to firmly root and efficiently absorb nutrients and water from deep soil layers. The root system of *Lolium perenne* consists of a small number of coarse roots and a large number of fine fiber roots. The weak fiber root system may enhance the biomass of *Lolium perenne* and increase its grass yield. Moreover, the root system yield may reach 15-22.5 tonne per square hectare (t/hm$^2$), showing the strong root growth ability of *Lolium perenne*. The root system of *Lolium perenne* grows very fast and may invade the soil quickly, thus obtaining enough nutrients. The root system of *Lolium perenne* not only has the function of absorbing nutrients and water, but also has the function of soil consolidation and water conservation. The strong root network of *Lolium perenne* helps to prevent soil erosion and improve soil structure.

The main root of *Vulpia myuros* is weak, but a large number of adventitious roots may be formed at the base of the stem, and then a developed fibrous root system may be formed. The depth of root system is generally up to 30 cm deep, with a maximum depth of 60 cm, and may effectively penetrate deep into the soil to absorb nutrients and water. The root system of the *Vulpia myuros* is mostly distributed in the 0-20 cm soil layer, which is the most active area for plant roots and helps plants absorb nutrients quickly. The root system of *Vulpia myuros* may firmly lock in soil moisture, prevent soil erosion, and improve soil aeration and permeability. After the death of the *Vulpia myuros*, the root system gradually rots under high temperature and humidity, providing a large amount of organic matter to the soil and improving its structure.

The root system of *Festuca arundinacea* belongs to the fibrous root system, consisting of the main root and lateral roots at all levels. The main root is usually thicker and may penetrate deep into the soil, playing a role in fixing plants and absorbing nutrients from deep soil layers. The lateral roots are distributed in a whisker like pattern, with a wide range of extension, which helps plants firmly root in the soil and absorb more water and nutrients. The depth of root system of *Festuca arundinacea* varies depending on the growth environment and variety, but usually ranges from 20 to 40 cm. Under loose, fertile, and well drained soil conditions, the root system of *Festuca arundinacea* may grow deeper, even reaching deeper soil layers. The root system of *Festuca arundinacea* has strong absorption capacity, which may efficiently absorb water and nutrients from the soil, meeting the growth needs of plants. Moreover, the root system of *Festuca arundinacea* also has the function of soil stabilization and water retention. The root system of *Festuca arundinacea* may also secrete organic matter during the growth process, improve soil structure, and enhance soil aeration and permeability.

Optionally, the grass seeds, soil, fertilizer, and water-retaining material are mixed in a mass ratio of 1:(0-3):(0-3):(2-3). The soil, fertilizer, and water-retaining material are preferably crushed and screened to avoid clumping, which is beneficial for root penetration. When the amounts of soil and organic fertilizer are zero, soilless cultivation is used for grass seed growth. To promote grass seed germination and growth, additional nutrient solution needs to be sprayed. When the amount of soil and organic fertilizer used is not zero, soil cultivation is adopted.

Optionally, the organic fertilizer is fermented chicken manure or fermented cow manure.

Optionally, the spreading thickness of the composite nutrient planting soil on each layer of biodegradable plastic net is 0.5-1 cm. The total thickness laid in step S2 and step S3 is 2-4 cm. If the total thickness is too large, it is not suitable for rolling, and if the total thickness is too small, it is not conducive to the cultivation of moss crusts. Therefore, the total thickness needs to be controlled within an appropriate range. Under the premise of a certain total thickness, the more layers there are, the more biodegradable plastic nets there are, and the better the mechanical properties of the nutrient water-retaining mat. However, the interlayer soil and fertilizer will decrease, which is not conducive to the growth and cultivation of moss crusts. If the number of layers is too small, the soil thickness will be too large, and separation between grass roots and plastic nets may occur during the rolling process. Therefore, the number of layers should be reasonably controlled.

An aspect of the present disclosure is to provide a nutrient water-retaining mat for artificial cultivation of moss crusts prepared by the above preparation method. Due to compaction, the thickness of the nutrient water-retaining mat obtained is 1-2 cm. The nutrient water-retaining mat prepared by the present disclosure uses a three-dimensional network structure formed by interpenetrating degradable plastic net, waste natural fibers, and grass roots as a substrate, with the soil, fertilizer, and water-retaining material loaded in the middle. The distribution of each part is uniform, and the mat not only has good mobility, but also provides rich nutrition and water for artificial cultivation of moss crusts.

An aspect of the present disclosure is to provide a method for artificial cultivation of moss crusts, where a nutrient water-retaining mat is sprayed and moistened with water, moss propagules are mixed with soil, and sprinkled on the surface of the moistened nutrient water-retaining mat for cultivation for 20-60 days. In the first month after sowing, the nutrient water-retaining mat may be covered with a thin film to promote moss germination. When the nutrient mat is prepared using soilless cultivation, the amount of mixed soil required for sowing of moss propagules needs to be appropriately increased; when the nutrient mat is prepared using soil cultivation, the amount of mixed soil required for sowing of moss propagules may be appropriately reduced.

The present disclosure also provides another method for artificial cultivation of moss crusts, where the nutrient water-retaining mat is sprayed and moistened with water, and then the moss propagules and chitosan are mixed with the soil, and then water is added to prepare uniform mud, and the mud is then sprayed onto the surface of the nutrient water-retaining mat. Chitosan has film-forming properties. Due to the small root system of moss, the root system is easily separated from the soil, especially when windy. Part of chitosan is doped in the mud, since chitosan has film-forming performance and viscosity, moss may be secured in the soil.

Optionally, the mass ratio of moss propagules, chitosan, and soil is (0.5-1):(3-5):10.

Compared to prior art, the present disclosure offers the following technical effects.

Moss crusts have windproof and sand fixation functions. The present disclosure overcomes the constraints of water and nutrients in arid regions, targeting soil habitat restoration, and provides advantages such as short construction cycles, high stability, efficient sand fixation, broad applicability, and simple operation.

BRIEF DESCRIPTION OF THE DRAWINGS

In order to explain the embodiments of the present disclosure or the technical solution in the prior art more clearly, the drawings needed in the embodiments will be briefly introduced below. Apparently, the drawings in the following description are only some embodiments of the present disclosure. For one of ordinary skill in the art, other drawings may be obtained according to these drawings without creative effort.

DETAILED DESCRIPTION OF THE EMBODIMENTS

Various exemplary embodiments of the present disclosure are now described in detail. This detailed description should not be construed as limiting the present disclosure but rather as providing a more detailed explanation of certain aspects, features, and implementations of the present disclosure.

It should be understood that the terms used herein are intended only to describe specific embodiments and are not intended to limit the present disclosure. Additionally, for numerical ranges in the present disclosure, it should be understood that each intermediate value between the upper and lower limits of the range is also specifically disclosed. Any stated value or intermediate value within a stated range, as well as any smaller range derived from such intermediate values, is also included in the present disclosure. The upper and lower limits of these smaller ranges may be independently included or excluded from the range.

Unless otherwise specified, all technical and scientific terms used herein have the same meanings as commonly understood by one of ordinary skill in the art to which this present disclosure belongs. Although only preferred methods and materials are described herein, any methods and materials similar or equivalent to those described may also be used in the practice or testing of the present disclosure. All publications cited herein are incorporated by reference to disclose and describe the methods and/or materials related to such publications. In case of conflict with any incorporated publication, the content of this specification shall prevail.

Various modifications and changes may be made to the specific embodiments described herein without departing from the scope or spirit of the present disclosure, as will be apparent to those skilled in the art. Other embodiments derived from the description herein will also be apparent to those skilled in the art. The description and embodiments herein are illustrative only.

As used herein, terms such as “comprising,” “including,” “having,” and “containing” are open-ended and mean “including but not limited to.”

Figure 6:
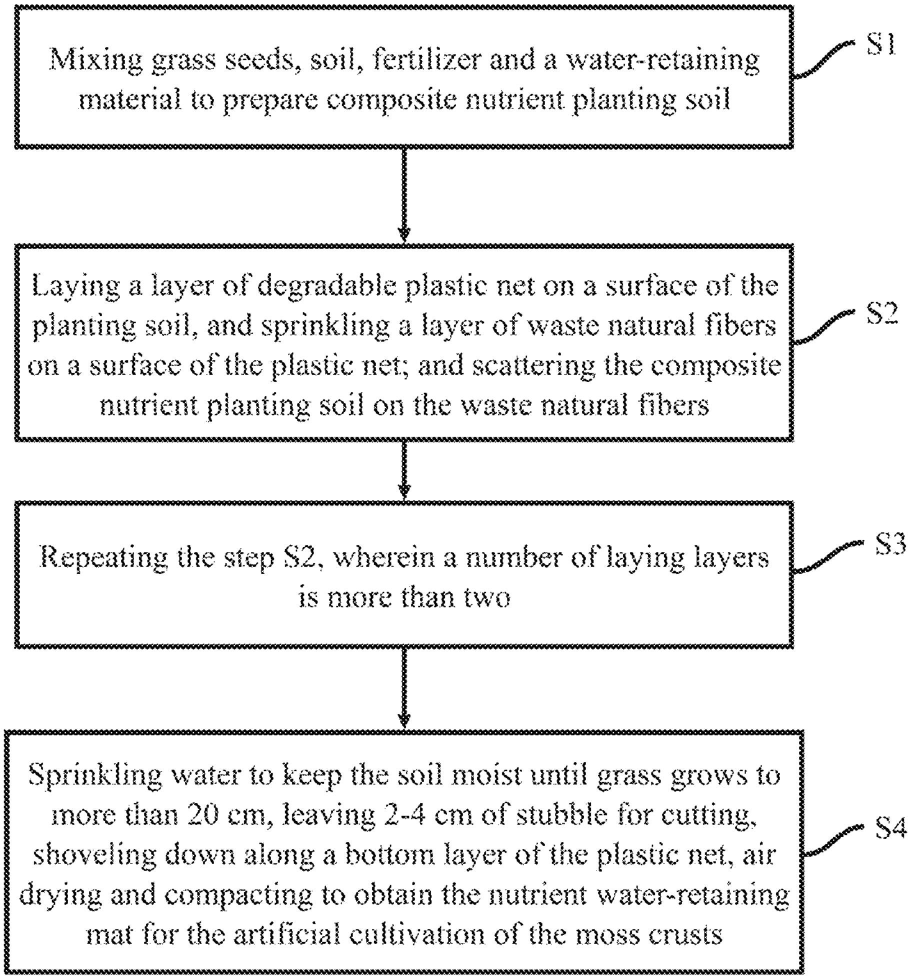
FIG. 6 is a flowchart of a preparation method of a nutrient water-retaining mat for artificial cultivation of moss crusts according to the present disclosure.

The embodiments of the present disclosure disclose a preparation method of a nutrient water-retaining mat for artificial cultivation of moss crusts, as shown in FIG. 6, including the following steps:

S1, mixing grass seeds, soil, fertilizer and a water-retaining material to prepare composite nutrient planting soil;

S2, laying a layer of degradable plastic net on the surface of the planting soil, and sprinkling a layer of waste natural fibers on the surface of the plastic net; and scattering the composite nutrient planting soil on the waste natural fibers;

S3, repeating the step S2, where the number of laying layers is more than two; and S4, sprinkling water to keep the soil moist until the grass grows to more than 20 cm, leaving 2-4 cm of stubble for cutting, shoveling down along the plastic net at a bottom layer, air drying and compacting to obtain the nutrient water-retaining mat for artificial cultivation of moss crusts.

According to the present disclosure, a degradable plastic net is adopted as a substrate to form a nutrient water-retaining mat as a whole in the horizontal direction. Composite nutrient planting soil is laid between layers of the degradable plastic net as a substrate layer for the grass seed growth, mixed with filamentous waste natural fibers. During the grass seed growth, the roots of grass penetrate through the meshes of the degradable plastic net, while the roots interweave with waste natural fibers. Waste natural fibers interweave with biodegradable plastic net, forming an integrated structure for the nutrient water-retaining mat in the longitudinal direction, so that the nutrient water-retaining mat has good mechanical properties and may be separated from the soil surface as a whole, improving the mobility of the nutrient water-retaining mat. The degradable plastic net and waste natural fibers have biodegradable properties, serving as nutrient substrates in the early stage of moss growth, gradually degrading during the late stage of moss growth, thereby integrating moss roots with transplanted soil. The water-retaining material absorbs and slowly releases moisture, facilitating moss crust growth in arid or desert regions. The fertilizer may provide nutrients for the grass seed growth, as well as necessary nutrients for the later cultivation of moss crusts, which is beneficial for shortening the cultivation period of moss crusts. After cutting grass plants, the nutrient water-retaining mat is air-dried as a whole to naturally form a grass mat. Grass straw has a hollow structure, which may be used as a water-retaining material on the one hand, and on the other hand, the grass straw degrades to form organic fertilizer when cultivating moss crusts. In addition, the moss root system is very small and easily separated from the soil when blown by the wind. The hollow structure of the dried grass straw may secure the moss propagules, preventing them from being blown away. The purpose of air drying the nutrient water-retaining mat is to kill the grass plants, avoiding grass crops participating in nutrient competition during later moss crust cultivation.

The waste natural fibers include substandard byproducts from cotton, hemp, or wool production. These fibers have a filamentous structure and are easily biodegradable. The type and mixing ratio of the waste natural fibers have no significant impact on the growth of grass or moss, so the waste natural fibers may be mixed in any proportion.

In some typical but non-limiting embodiments, the grass seeds are selected from at least one of *Lolium perenne* grass seeds, *Vulpia myuros* grass seeds, and *Festuca arundinacea* grass seeds. The *Lolium perenne* grass seeds, *Vulpia myuros* grass seeds, and *Festuca arundinacea* grass seeds all have well-developed fibrous roots and excellent growth performance, serving to form dried grass mats. Therefore, their species and mixing ratios do not significantly affect moss growth, and any species or mixing ratio may be selected in the embodiments.

In some typical but non-limiting embodiments, the grass seeds, soil, fertilizer, and water-retaining material are mixed in a mass ratio of 1:(0-3):(0-3):(2-3). The soil, fertilizer, and water-retaining material are preferably crushed and sieved to avoid clumps, facilitating root penetration. When the amount of soil and fertilizer is zero, soilless cultivation is used for the grass seed growth. Additional nutrient solution needs to be sprayed to promote germination and grass seed growth. When the amounts of soil and fertilizer are not zero, soil cultivation is adopted.

In some typical but non-limiting embodiments, the fertilizer is an organic fermented fertilizer. In more preferred embodiments, the fertilizer is selected from fermented chicken manure or fermented cow manure.

In some typical but non-limiting embodiments, the spreading thickness of composite nutrient planting soil on each layer of degradable plastic net is 0.5-1 cm. The total thickness of the layers formed in steps S2 and S3 is 2-4 cm. If the total thickness is too large, the mat is difficult to roll; if the total thickness is too small, it is unsuitable for moss crust cultivation. Therefore, the total thickness needs to be controlled within an appropriate range. Under the premise of a certain total thickness, the more layers there are, the more biodegradable plastic nets there are, and the better the mechanical properties of the nutrient water-retaining mat. However, the interlayer soil and fertilizer will decrease, which is not conducive to the growth and cultivation of moss crusts. If the number of layers is too small, the soil thickness will be too large, and separation between grass roots and plastic nets may occur during the rolling process. Therefore, the number of layers should be reasonably controlled.

The nutrient water-retaining mat prepared by the above method in the embodiment of the present disclosure uses a three-dimensional network structure formed by interpenetrating the degradable plastic net, waste natural fibers, and grass roots as a substrate, with the soil, fertilizer, and water-retaining material loaded in the middle. The distribution of each part is uniform, and the mat not only has good mobility, but also provides rich nutrition and water for artificial cultivation of moss crusts.

The nutrient water-retaining mat provided in the embodiment of the present disclosure may be used for the method for artificial cultivation of moss crusts. The specific method is as follows: spraying water to moisten the nutrient water-retaining mat, mixing moss propagules and soil, adding water to prepare mud, and then spraying the mud onto the surface of the nutrient water-retaining mat, and culturing for 15-25 days. The mixing ratio of moss propagules to soil depends on the planting density of the moss propagules, such as 1:(3-5). When the nutrient mat is prepared using soilless cultivation, the amount of mixed soil required for sowing of moss propagules needs to be appropriately increased, such as 1:5; when the nutrient mat is prepared using soil cultivation, the amount of mixed soil required for sowing of moss propagules may be appropriately reduced, such as 1:3.

Another method for artificial cultivation of moss crusts disclosed in some embodiments involves spraying water to moisten the nutrient water-retaining mat, mixing moss propagules, chitosan, and soil, adding water to prepare uniform mud, and then spraying the mud onto the surface of the nutrient water-retaining mat, and culturing for 15-25 days. Chitosan has film-forming properties. Due to the small root system of moss, the root system is easily separated from the soil, especially when windy. Part of chitosan is doped in the mud, since chitosan has film-forming performance and viscosity, moss may be secured in the soil.

The amount of chitosan should not be excessive. If the amount of chitosan is too large, it will cause excessive film thickness and affect the moss growth. Therefore, in some typical but non-limiting embodiments, the mass ratio of moss propagules, chitosan, and soil is (0.5-1):(3-5):10. When the nutrient mat is prepared using soilless cultivation, the amount of mixed soil required for sowing of moss propagules needs to be appropriately increased; when the nutrient mat is prepared using soil cultivation, the amount of mixed soil required for sowing of moss propagules may be appropriately reduced.

In some embodiments, the moss species may specifically include *Racomitrium canescens* (Hedw.) Brid., *Bryum argenteum, Didymodon tectorum, Didymodon vinealis*, or *Barbula unguiculata.*

*Bryum argenteum*: a plant belonging to the *Bryum* genus, characterized by perennial growth and diverse morphological and size changes. The stems of *Bryum argenteum* are erect, and the leaves are ovate, elliptical, or lanceolate, densely clustered. *Bryum argenteum* is one of the dominant drought-tolerant moss species in the loess plateau moss crusts. Although the drought tolerance of *Bryum argenteum* is inferior to *Didymodon vinealis* and *Didymodon tectorum*, it remains an important species for cultivation.

*Didymodon vinealis*: a species of the *Didymodon* genus with strong drought tolerance, making it one of the most drought-tolerant species in the loess plateau moss crusts. The plants of *Didymodon vinealis* are densely clustered and cushion-like, commonly found in calcareous soils and rocks. The stems of *Didymodon vinealis* are erect, and the leaves are ovate-lanceolate or narrowly lanceolate, with sharp or tapered tips. *Didymodon vinealis* is a preferred species for cultivating moss crusts.

*Didymodon tectorum*: also a species of the *Didymodon* genus with strong drought tolerance. The upper part of the leaf edge of the *Didymodon tectorum* is flattened or rolled back, similar in morphological characteristics to *Didymodon vinealis*, but the leaf shape is shorter. *Didymodon tectorum* is also one of the important species for cultivating moss crusts.

*Barbula unguiculata*: although the drought resistance of *Barbula unguiculata* is relatively weak, it may still serve as a species for cultivating moss crusts under certain specific conditions. The stems of *Barbula unguiculata* are erect and the leaf shape is varied, which may adapt to environmental conditions.

*Racomitrium canescens* (Hedw.) Brid.: typically appears as loose clusters of yellowish-green plants without gloss. The stems are 3-4 cm long, erect, and may be single or sparsely branched. The leaves are loosely attached when dry and recurved when moist, shaped like long ovals. The leaf margins are entire and often incurved, with a thick midrib protruding from the leaf tip as a white hair-like spine. The upper leaf cells are rounded-square, while the basal cells are narrow and elongated with dense papillae.

It should be noted that any technical means not detailed in the embodiments of the present disclosure may be implemented using conventional techniques.

The raw materials used in the embodiments of the present disclosure are all obtained through conventional commercial channels. The water-retaining material is potassium polyacrylate granules purchased from Wuxi Fengmin Environmental Technology Development Co., Ltd.

In the following embodiments of the present disclosure, the grass seeds are *Lolium perenne* grass seeds, and the fertilizer is a mixture of fermented chicken manure and fermented cow manure in equal proportions.

The soil used in the following embodiments is ordinary yellow loam. The nutrient solution is purchased from Dongguan Mengyuan Environmental Technology Co., Ltd., and is diluted with 4 liter (L) of water per 10 milliliter (mL) for use.

The moss species selected in the following embodiments is *Bryum argenteum.*

Embodiment 1-Embodiment 5 and Comparative Example 1-Comparative Example 3

A preparation method of a nutrient water-retaining mat for artificial cultivation of moss crusts includes the following steps:

S1, mixing grass seeds, soil, fertilizer and a water-retaining material in the proportions listed in Table 1 to prepare composite nutrient planting soil (in Embodiment 5, the amounts of soil and fertilizer are zero, requiring additional spraying of nutrient solution twice daily to promote seed germination and growth);

S2, laying a layer of degradable plastic net (polylactic acid (PLA) plastic net) on the surface of the planting soil, sprinkling a layer of waste natural fibers on the surface of the plastic net, and then scattering the composite nutrient planting soil over the waste natural fibers;

S3, repeating the step S2, where the number of laying layers is three, and the laying thickness of each layer of composite nutrient planting soil is 1 cm; and S4, sprinkling water to keep the soil moist until the grass grows to more than 20 cm, leaving 2-4 cm of stubble for cutting, shoveling down along the plastic net at a bottom layer, air drying and compacting to a thickness of 2 cm, thereby obtaining the nutrient water-retaining mat for artificial cultivation of moss crusts.

Amounts of grass seeds, soil, fertilizer, and water-retaining material used in Embodiment 1-Embodiment 5 and Comparative Example 1-Comparative Example 3 are listed in Table 1.

TABLE 1

(Mass Parts)

| | Grass seeds | Soil | Fertilizer | Water-retaining material |
|---|---|---|---|---|
| Embodiment 1 | 1 | 1 | 2 | 2 |
| Embodiment 2 | 1 | 2 | 3 | 2.5 |
| Embodiment 3 | 1 | 3 | 2.5 | 3 |
| Embodiment 4 | 1 | 2 | 2 | 2.5 |
| Embodiment 5 | 1 | 0 | 0 | 2.5 |
| Comparative Example 1 | 1 | 2 | 0 | 3 |
| Comparative Example 2 | 1 | 2 | 3 | 0 |
| Comparative Example 3 | 1 | 2 | 0 | 0 |

A sandy soil plot is selected as the experimental plot, and the nutrient water-retaining mats prepared in Embodiment 1-Embodiment 5 and Comparative Example 1-Comparative Example 3 are used as substrate layers for cultivating moss crusts.

Application Example 1

Figure 1:
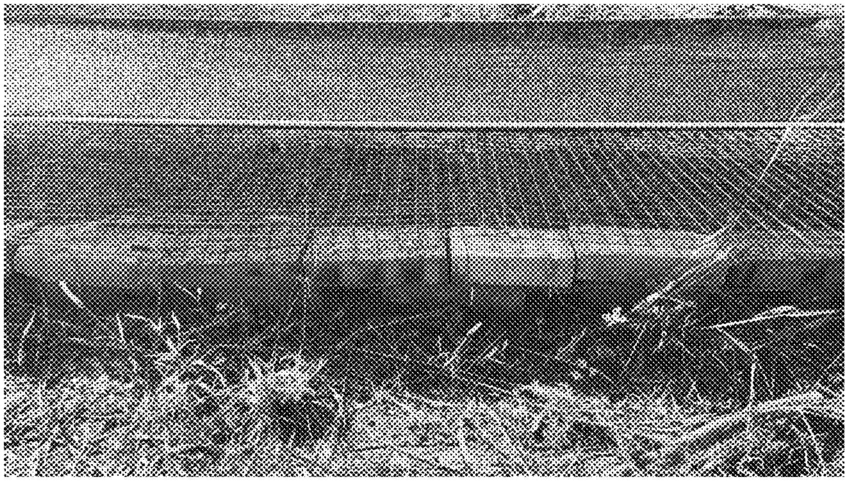
FIG. 1 is a physical diagram of a moss crust cultivation process in Application Example 1 of the present disclosure.

The moss propagules are mixed with soil in a mass ratio of 1:5 (for Embodiment 5) or 1:3 (for Embodiment 1-Embodiment 4 and Comparative Example 1-Comparative Example 3) and sown on the surfaces of the nutrient water-retaining mats, ensuring that the amount of moss propagules per square meter is 10 grams (g). As shown in FIG. 1, bricks are used to support the edges of each nutrient water-retaining mat, and a grid is placed on top to calculate the coverage area. The shade nets are covered from 11:00 to 15:00 daily to avoid direct sunlight. Water is sprayed frequently to maintain soil moisture. After a period of cultivation, moss crops form crusts. The coverage rates of periodic surveys for each embodiment and comparative example are listed in Table 2.

TABLE 2

Coverage rate statistics

| | Day 10 | Day 20 | Day 40 | Day 60 |
|---|---|---|---|---|
| Embodiment 1 | 22% | 36% | 75% | 93% |
| Embodiment 2 | 20% | 34% | 73% | 89% |
| Embodiment 3 | 25% | 38% | 70% | 90% |
| Embodiment 4 | 23% | 32% | 72% | 92.5% |
| Embodiment 5 | 20% | 33% | 68% | 86% |
| Comparative Example 1 | 13% | 20% | 46% | 65% |
| Comparative Example 2 | 10% | 18% | 49% | 60% |
| Comparative Example 3 | 5% | 12% | 31% | 49% |

Note:
coverage rate = (area covered by moss crusts/total test area) × 100%.

Figure 3:
FIG. 3 is a physical diagram of moss crust cultivation after 60 days using a nutrient water-retaining mat in Embodiment 1 of the present disclosure.

As shown in Table 2, the coverage rates of moss crusts in Embodiment 1-Embodiment 5 are significantly higher than those in Comparative Example 1-Comparative Example 3, indicating that the addition of fertilizer and water-retaining material facilitates rapid moss crust formation. Among them, the nutrient water-retaining mat of Embodiment 1 achieves the highest coverage rate (see FIG. 3), while the nutrient water-retaining mat of Comparative Example 3 has the lowest coverage rate. Therefore, the nutrient water-retaining mat of Embodiment 1 is used for subsequent experiments in Application Example 2-Application Example 4.

Application Example 2

Figure 4:
FIG. 4 is a physical diagram of moss crust cultivation after 40 days in Application Example 2.

The moss propagules, chitosan, and soil are mixed in a mass ratio of 1:5:10, and water is added to prepare uniform mud. The mud is then sprayed onto the nutrient water-retaining mat. Water is sprayed daily to maintain soil moisture. After 60 days of cultivation, the coverage rate reaches 90%, and the growth status is shown in FIG. 4.

Application Example 3

Figure 5:
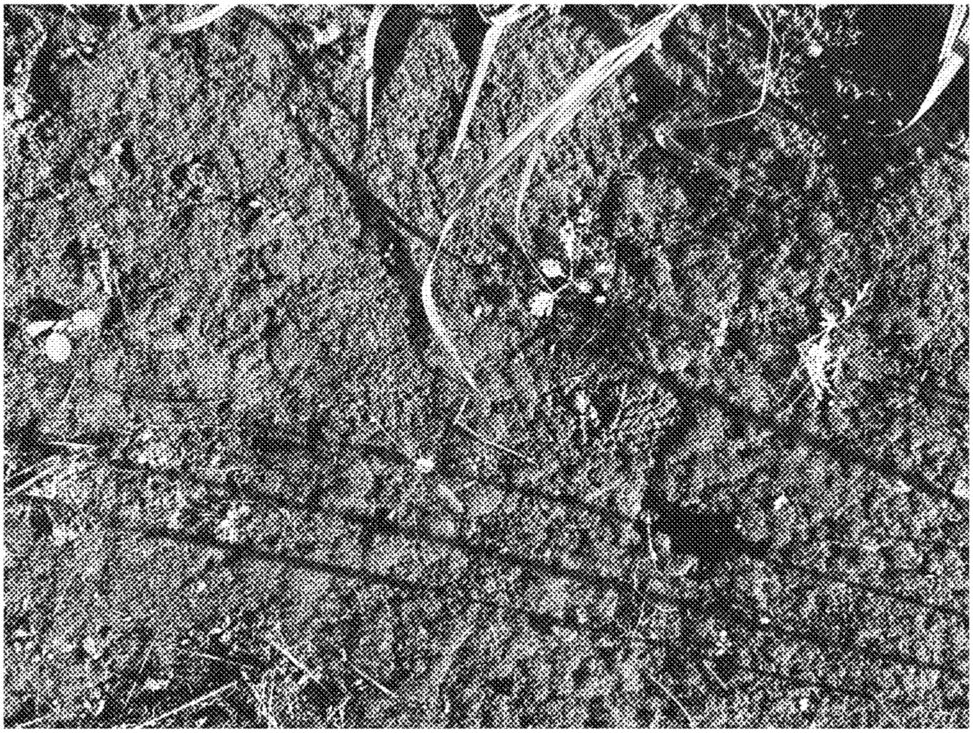
FIG. 5 is a physical diagram of moss crust cultivation after 40 days in Application Example 3.

The moss propagules, chitosan, and soil are mixed in a mass ratio of 1:3:10, and water is added to prepare uniform mud. The mud is then sprayed onto the nutrient water-retaining mat. Water is sprayed daily to maintain soil moisture. After 60 days of cultivation, the coverage rate reaches 90%, and the growth status is shown in FIG. 5.

Application Example 4

The moss propagules, chitosan, and soil are mixed in a mass ratio of 0.5:5:10, and water is added to prepare uniform mud. The mud is then sprayed onto the nutrient water-retaining mat. Water is sprayed daily to maintain soil moisture. After 60 days of cultivation, the coverage rate reaches 90%.

Blank Control Application

Figure 2:
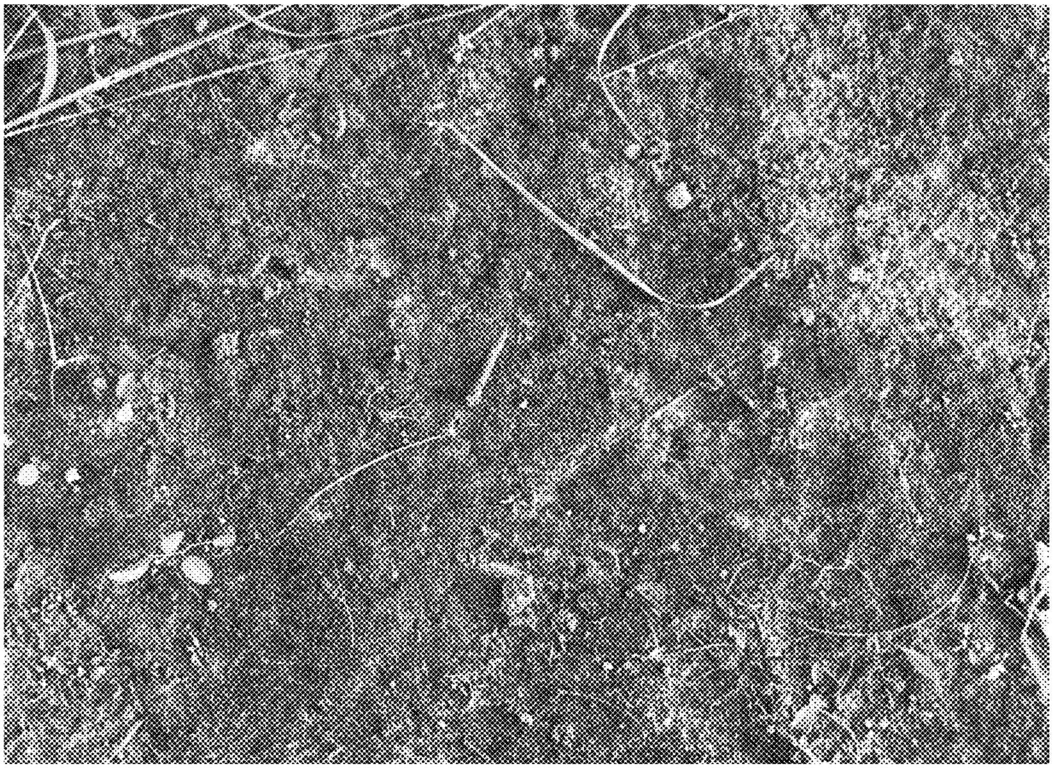
FIG. 2 is a physical diagram of moss crust cultivation after 60 days using a nutrient water-retaining mat in Blank Control Application of the present disclosure.

The moss propagules are mixed with soil in a mass ratio of 1:3 and then sown directly on the soil surface, ensuring 10 g of moss propagules per square meter. The shade nets is covered from 11:00 to 15:00 daily to avoid direct sunlight. Water is sprayed frequently to maintain soil moisture. After a period of cultivation, moss crops form crusts, as shown in FIG. 2. From FIG. 2, it may be seen that crust culture method of direct sowing on the soil surface is far less effective than using the nutrient water-retaining mat.

In summary, the moss crusts prepared in the application examples of the present disclosure form an integrated structure similar to a lawn with the nutrient water-retaining mats. For regions with poor climatic or soil conditions (e.g., arid desert areas), the entire mat may be moved after achieving a certain coverage rate. For areas with relatively good climate and soil conditions, the nutrient water-retaining mat may be placed directly for moss crust cultivation. Since all components of the nutrient water-retaining mat are biodegradable, the nutrient water-retaining mat gradually degrades as the moss grows, providing organic matter to the soil and integrating with the underlying soil. It should be noted that since the nutrient water-retaining mat is air-dried, some residual grass seeds may not be completely killed and may revive during moss crust cultivation. Additionally, some grass seeds in the soil may grow through the pores of the nutrient water-retaining mat and may be manually removed or retained, as small amounts of grass do not significantly affect moss growth.

The above-mentioned embodiments only describe the preferred mode of the present disclosure, and do not limit the scope of the present disclosure. Under the premise of not departing from the design spirit of the present disclosure, various modifications and improvements made by one of ordinary skill in the art to the technical solution of the present disclosure should fall within the protection scope determined by the claims of the present disclosure.

What is claimed is:

1. A preparation method of a nutrient water-retaining mat for artificial cultivation of moss crusts, comprising the following steps:

step 1, mixing grass seeds, soil, fertilizer and a water-retaining material in a mass ratio of 1:1:2:2 to obtain composite nutrient planting soil;

step 2, laying a layer of degradable plastic net on a surface of the composite nutrient planting soil, sprinkling a layer of waste natural fibers on a surface of the layer of degradable plastic net, and scattering the composite nutrient planting soil on the layer of waste natural fibers;

step 3, repeating the step 2, wherein a number of laying layers is more than two;

step 4, sprinkling water to keep the composite nutrient planting soil moist until grass grows to more than 20 cm, leaving 2-4 cm of stubble for cutting, shoveling down along the layer of degradable plastic net at a bottom layer, air drying and compacting to obtain the nutrient water-retaining mat; and step 5, spraying water onto and moistening the nutrient water-retaining mat, mixing moss propagules, chitosan, and additional soil in a mass ratio of (0.5-1):(3-5):10, adding water to prepare uniform mud, and spraying the uniform mud onto a surface of the nutrient water-retaining mat for the artificial cultivation of the moss crusts.

2. The preparation method according to claim 1, wherein the grass seeds are selected from at least one of *Lolium perenne* grass seeds, *Vulpia myuros* grass seeds, or *Festuca arundinacea* grass seeds.

3. The preparation method according to claim 1, wherein the fertilizer is fermented chicken manure or fermented cow manure.

4. The preparation method according to claim 1, wherein a spreading thickness of the composite nutrient planting soil on each of the layers of degradable plastic net is 0.5-1 cm.

5. A nutrient water-retaining mat for artificial cultivation of moss crusts prepared by the preparation method according to claim 1, wherein a thickness of the nutrient water-retaining mat is 1-2 cm.

* * * * *